Patented July 6, 1948

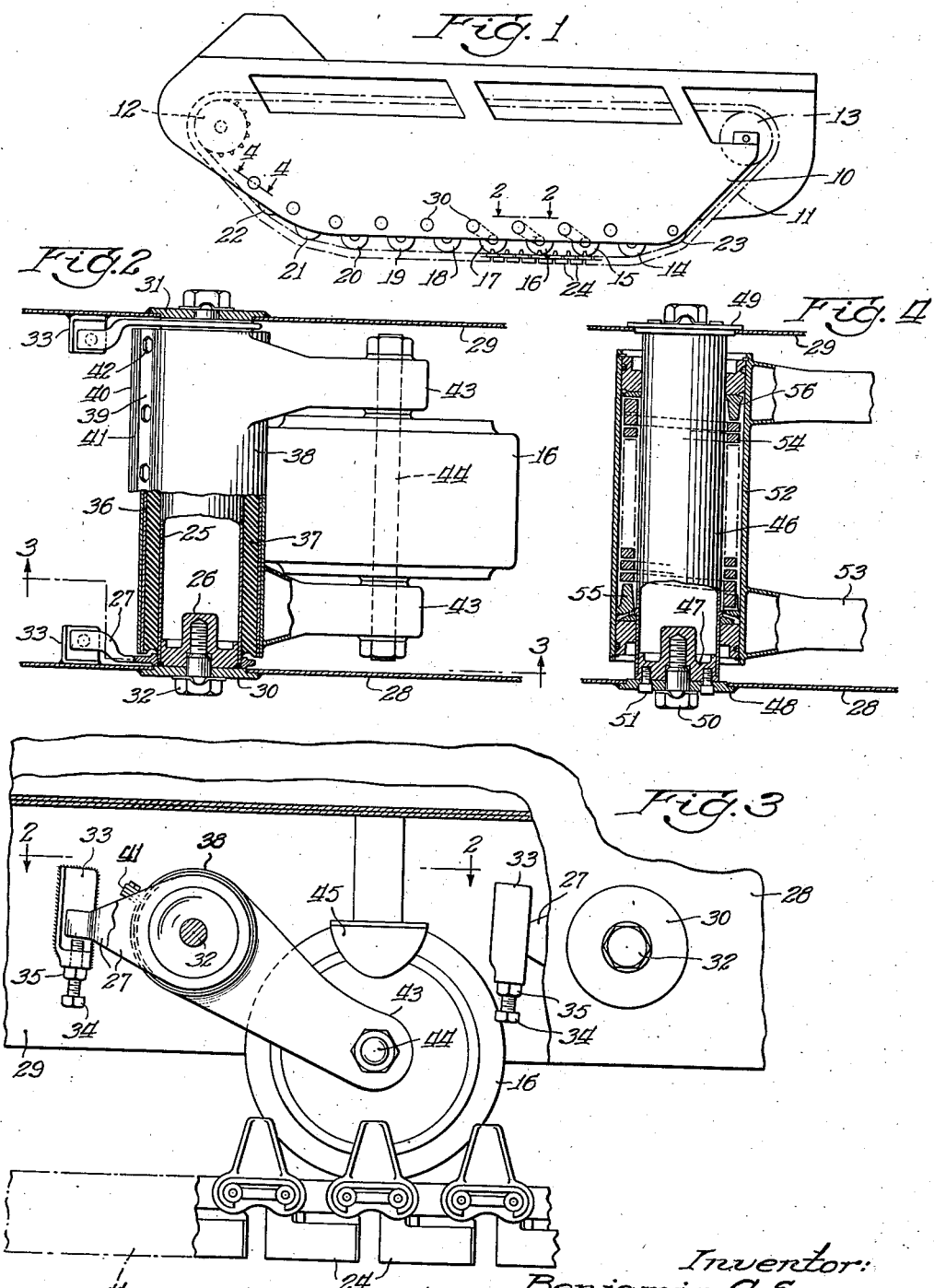

2,444,759

UNITED STATES PATENT OFFICE 2,444,759

WHEELED VEHICLE

Benjamin A. Swennes, Rockford, Ill., assignor, by mesne assignments, to the United States of America as represented by the Secretary of the Navy Application November 15, 1943, Serial No. 510,296

8 Claims. (Cl. 305—9)

My invention relates to a wheeled vehicle and more particularly to a vehicle having a pair of articulated tracks on opposite sides for propelling the vehicle and having a plurality of wheels on each side of the vehicle disposed in tandem and running on the tracks and yieldingly connected with the body of the vehicle for supporting the vehicle with respect to the tracks.

Such tracked vehicles have heretofore been used in which all of the wheels on each side of one of the vehicles each supported substantially equal proportions of the weight of the vehicle. It was found, however, with such a tracked vehicle construction that the vehicle when being run tended to rock about intermediate supporting wheels of the vehicle with the front and rear ends of the vehicle alternatively moving up and down, and the contents of the vehicle were thus subjected to excessive shaking.

It is an object of my invention to provide a supporting construction for a tracked vehicle of this type which is such that such rocking effect about intermediate supporting wheels of the vehicle is suppressed. To this end it is an object of my invention to provide such a vehicle in which end supporting wheels on each side of the vehicle take a greater proportion of load than do supporting wheels intermediate the end wheels.

Tracked vehicles have heretofore been used in which the supporting wheels running on the tracks were each operatively connected with the body of the vehicle by means of a rubber torsion member, and it has been found with such a construction that the rubber torsion members after a period of use became fatigued whereby the supporting wheels thereafter failed to hold the body of the vehicle at the proper height and failed to keep the tracks at the sides of the vehicle in their proper looped configurations.

It is therefore an object of my invention to provide a torsion member construction for use in such a vehicle which is adjustable with respect to the body of the vehicle whereby a torsion member may be increasingly stressed to compensate for fatigue in the member. It is also contemplated that the torsion members for each of the supporting wheels on each side of the vehicle may be so adjustable whereby the end wheels on each side of the vehicle may be adjusted to carry a greater proportion of load than wheels intermediate the end wheels for the purposes above described.

The invention consists of the novel constructions, arrangements and devices to be hereinafter described and claimed for carrying out the above stated objects and such other objects as will appear from the following description of a certain preferred embodiment illustrated in the accompanying drawing, wherein:

Fig. 1 is a side elevational view of a tracked vehicle embodying the principles of the invention;

Fig. 2 is a sectional view taken on lines 2—2 of Figs. 1 and 3, and being on an enlarged scale with respect to Fig. 1;

Fig. 3 is a sectional view taken on line 3—3 of Fig. 2; and

Fig. 4 is a sectional view on an enlarged scale taken on line 4—4 of Fig. 1.

Like characters of reference designate like parts in the several views.

Referring to the drawing, the illustrated vehicle comprises a vehicle body 10 having movably disposed on opposite sides thereof tracks 11 for propelling the vehicle (one side only of the vehicle being shown in the drawing). The track on each side of the vehicle has a looped configuration and is held in such configuration by means of wheels 12 and 13 disposed respectively at the front and rear of the vehicle and rotating on fixed axes with respect to body 10, bogie wheels 14, 15, 16, 17, 18, 19 and 20 constituting supporting wheels for the vehicle body 10, bogie wheels 21 and 22 at the front of the vehicle constituting wheels for absorbing shock due to rough terrain, and an idler wheel 23 at the rear of the vehicle rotating on a fixed axis with respect to the body 10. It is contemplated that the body 10 shall preferably be water-tight such that the vehicle may float and may function as a boat and that the tracks 11 shall be provided with lugs 24 of such shape that when the vehicle is floating in the water and the tracks 11 are driven, the tracks will propel the vehicle through the water. When the vehicle is on land and the tracks are driven, the lugs 24 will of course engage the ground, and the tracks will propel the vehicle over land. It is further contemplated that the tracks 11 may be driven by means of the wheels 12 on opposite sides of the vehicle which may have sprocket teeth provided on their peripheries to engage with the tracks and which may be driven by any suitable source of motive power inside the vehicle body 10. The shape of the lugs 24, the type of motive power to be provided and other details of the vehicle may be such as are disclosed in my copending application, Serial No. 508,304 filed October 30, 1943.

The bogie wheels 14 to 20 on each side of the vehicle constitute supporting wheels for the vehicle and each wheel is similarly swingingly and yieldingly mounted with respect to the vehicle body 10. Referring to Figs. 2 and 3 of the drawing, the connection between the bogie wheel 16 and the vehicle body 10 comprises a metal cylinder 25 which is pivotally mounted with respect to the body 10 of the vehicle. The cylinder 25 has fixed thereto, at each of its ends, a member 26 of generally cylindrical form fitting in the cylinder and also a reaction arm 27 provided with an appropriate opening therein to fit about the cylinder. The vehicle body 10 comprises, on each side thereof, vertically extending wall portions 28 and 29 between which the bogie wheels are disposed, and the wall portions have fixed thereto, in appropriate openings provided in the wall portions, disc-like plates 30 and 31 respectively. Bolts 32 extend through appropriate center openings provided in the plates 30 and 31, and the bolts are screwed into the members 26 fixed to the cylinders 25. The cylinder 25, together with the reaction arms 27, the end members 26 for the cylinders and the bolts 32 may pivot with respect to the wall portions 28 and 29 and the plates 30 and 31, with the central openings in the plates 30 and 31 forming journals for the bolts 32, as is apparent.

The reaction arms 27 are adjustably fixed with respect to the wall portions 28 and 29 of the vehicle body 10 for holding the inner cylinder 25 against movement and for adjusting the cylinder pivotally with respect to the walls 28 and 29 as desired. Each of the wall portions 28 and 29 has fixed thereto a bracket 33 in which is disposed an adjusting screw 34 having a lock nut 35 thereon. The arms 27 are adapted to have abutting contact with the adjusting screws 34, and the screws function to limit the counterclockwise movement, as seen in Fig. 3, of the reaction arms.

An outer metal cylinder 36 is disposed about the cylinder 25, and a cylindrical member 37 of rubber is disposed between the cylinders 25 and 36. The member 37 is fixed to each of the cylinders, as by vulcanizing, whereby the member 37 forms a yieldable torsion element operatively between the inner and outer metal cylinders. Another metal cylinder 38 is disposed to fit closely about the cylinder 36. The cylinder 38 is split and is provided with flanges 39 and 40, and a metal key 41 is disposed between the flanges and extends into a split in the metal cylinder 36 for fixing the cylinders 38 and 36 together. Screws 42 extending through the flanges 39 and 40 and the key 41 are provided for holding the cylinder 38 tightly disposed over the cylinder 36 and for holding the key 41 in place. The cylinder 38 has fixed thereto a pair of arms 43, and the bogie wheel 16 is rotatably disposed between the arms by means of a shaft 44 extending through the wheel and arms and fixed with respect to the arms. A bumper 45 is preferably provided for the outermost of the arms 43 for limiting the movement of the wheel 16 toward the vehicle body 10. For a more detailed disclosure of the yielding connection between each of the vehicle supporting wheels and the vehicle body, the co-pending application of Carl E. Swenson, Serial No. 513,430, filed December 8, 1943, now Patent No. 2,436,681, Feb. 24, 1948, may be referred to.

It will be apparent that the connections between the body 10 and the vehicle supporting bogie wheels 14 to 20 may be adjusted whereby the individual wheels carry the desired proportions of the load. If the adjusting screws 34 are turned so as to move the reaction arms 27 of one of the wheels in a clockwise direction as seen in Fig. 3, the rubber member 37 of that wheel will be more greatly stressed and the wheel will carry a greater proportion of the load. The proportion of load carried by one of the wheels may be decreased by adjusting the reaction arms 27 of that wheel in the opposite direction. It will be apparent that when the vehicle travels over rough terrain the various vehicle supporting bogie wheels will in general carry varying proportions of the load, with the torsion member 37 of a bogie wheel which is directly over a high spot of ground being more greatly stressed than the torsion member of a bogie wheel over a low spot of ground. The yielding connections between the vehicle and the supporting bogie wheels thus make it possible for the tracks 11 to conform to rough ground, and it will be apparent also that the torsion members 37 act as spring means for the vehicle as a whole to cushion the vehicle body 10 against jars. The rubber torsion members 37 have also the additional function of providing a shock absorber action to suppress continued oscillation or up and down movement of the vehicle body after the vehicle has passed over rough ground. This function of the rubber torsion members is due to the internal friction in the rubber torsion members themselves.

I have found that superior riding and load carrying qualities in a vehicle of this type are obtained if the torsion members 37 are adjusted such that various ones of the vehicle supporting bogie wheels carry greater loads than the other of the wheels when the vehicle is on a flat horizontal surface, rather than with an adjustment of the torsion members such that the vehicle supporting bogie wheels carry equal loads. For such improved performance, the torsion members 37 for the end vehicle supporting bogie wheels 14, 15, 19 and 20 on each side of the vehicle are adjusted such that these bogie wheels carry more of the load than the bogie wheels 16, 17 and 18 between the end bogie wheels. With such an adjustment of load on the various vehicle supporting bogie wheels, a "hobby horse" effect, that is, oscillation of the vehicle about intermediate supporting bogie wheels or some axis extending horizontally and transversely of the vehicle, is suppressed. This "hobby horse" effect is particularly pronounced if the vehicle supporting bogie wheels all carry substantially the same load as has been hereinbefore mentioned. In a certain embodiment of my invention, good results were obtained by adjusting the torsion members 37 such that the bogie wheels 14, 15, 19 and 20 on each side of the vehicle each carried 2600 to 2700 pounds and such that each of the intermediate bogie wheels 16, 17 and 18 carried 2,000 to 2,100 pounds when the vehicle rested on a flat horizontal surface.

The shock absorbing bogie wheels 21 and 22 are also connected with the vehicle body 10 by means of swinging yielding connections, the yielding members in the connections being, however, less powerful and applying less force to the wheels 21 and 22 than is applied by the yielding connections for the vehicle supporting bogie wheels. The bogie wheels 21 and 22 on each side of the vehicle function, as is apparent, to cushion the vehicle when bumps or high spots of ground are encountered by the vehicle.

The yielding connections for the bogie wheels 21 may be similar to the connections for the vehicle supporting bogie wheels 14 to 20 with the exception that rubber torsion members 37 of less length than shown in Fig. 3 are preferably provided between the cylinders 36 and 25.

The yielding connections for each of the bogie wheels 22 on opposite sides of the vehicle are the same. The yielding connection for the wheel 22 shown in Fig. 1 comprises an inner cylinder 46 which is fixed with respect to the wall portions 28 and 29. The cylinder 46 is thus fixed by means of members 47 fitting in and fixed to the cylinder 46 at its ends, plates 48 and 49 extending through appropriate openings in the wall portions 28 and 29, respectively, and fixed to the wall portions, bolts 50 extending through appropriate central openings provided in the plate members 48 and 49 and screwed into the end members 47 and set screws 51 extending through the plates 48 and 49 and into the end members 47. An outer cylinder 52 is disposed over the inner cylinder; and a pair of arms 53 is fixed to the outer cylinder, and these function to carry a wheel 22 in the same manner as a wheel 16 is carried by arms 43. A spring 54 is disposed in the chamber formed between the cylinders 46 and 52 and is operatively connected between the cylinders by means of a ring 55 fixed with respect to the cylinder 52 and a ring 56 fixed with respect to the cylinder 46. Each of the rings has a slot for receiving the adjacent end of the spring 54 for anchoring the spring. The yielding connections for the wheels 22 are such that the springs function to move the associated wheels 22 outwardly away from the vehicle to provide tension in the respective tracks, and the springs yield when a bump or high spot is encountered by the vehicle. The springs 54 provide a considerably greater movement of the wheels 22 than do the rubber torsion members in the yielding connections for the other bogie wheels, and in a particular embodiment of my invention the springs 54 provided a swing of substantially 100° for the arms 53 and functioned satisfactorily to maintain tension in the tracks.

It has been found that, after considerable periods of usage of rubber torsion members as in this vehicle, the rubber torsion members exhibit evidences of fatigue or permanent stretching, and they fail to support the vehicle at the same height as they were first adjusted to do. The adjustments provided for the yielding connections for the bogie wheels, however, advantageously allow the yielding connections to be readjusted to compensate for the fatigue and creep in the rubber torsion members. These adjustments for the yielding connections of the bogie wheels with the vehicle body furthermore allow an expeditious initial adjustment of the vehicle supporting bogie wheels whereby the end wheels 14, 15, 19 and 20 take a greater portion of the load than the intermediate bogie wheels 16, 17 and 18 therebetween for the purposes hereinbefore described. There is substantially no fatigue in the spring 54, and no adjustment has been found necessary for this spring.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In a vehicle, the combination of a vehicle body, at least three supporting wheels for the vehicle disposed in tandem on each side of the body, and means yieldingly connecting each of said wheels and said body, said yielding means for each of a pair of end wheels on each side of the body exerting a greater force on the wheel than the force exerted on the wheels intermediate the end wheels by their yielding means so that each of the end wheels supports a greater part of the weight of the body than a wheel intermediate the end wheels when the vehicle is on a flat surface whereby to suppress rocking of the vehicle on intermediate wheels thereof.

2. In a vehicle, the combination of a vehicle body, at least three supporting wheels for the vehicle disposed in tandem on each side of the body, means yieldingly connecting each of said wheels and said body, and adjusting means for said yielding means, said yielding means being adjusted thereby so that the yielding means for each of a pair of end wheels on each side of the body exerts a greater force on the wheel than the force exerted on the wheels intermediate the end wheels by their yielding means so that each end wheel supports a greater part of the weight of the body than a wheel intermediate the end wheels when the vehicle is on a flat surface whereby to suppress rocking of the vehicle on intermediate wheels thereof.

3. In a vehicle, the combination of a vehicle body, a pair of tracks on opposite sides of the body movable with respect to the body for propelling the vehicle, at least three wheels disposed in tandem on each side of the body for supporting the body with respect to the tracks, and means yieldingly connecting each of said wheels and said body, said yielding means for each of a pair of end wheels on each side of the body exerting a greater force on the wheel than the force exerted on the wheels intermediate the end wheels by their yielding means so that each of the end wheels supports a greater part of the weight of the body than a wheel intermediate the end wheels when the vehicle is on a flat surface whereby to suppress rocking of the vehicle on intermediate wheels thereof with respect to the tracks.

4. In a vehicle, the combination of a vehicle body, a pair of tracks on opposite sides of the body and movable with respect to the body for propelling the vehicle, a plurality of wheels disposed in tandem on each side of the body for supporting the body with respect to the tracks, said plurality of wheels on each side of the body comprising a plurality of intermediate wheels and a plurality of end wheels both in front of and behind the intermediate wheels, means yieldingly connecting each of said wheels and said body, and adjusting means for said yielding means, said yielding means being so adjusted thereby that the yielding means for each of said end wheels exerts a greater force on the wheel than the force exerted on the wheels intermediate the end wheels by their yielding means so that each end wheel supports a greater part of the weight of the body than each of the intermediate wheels when the vehicle is on a flat surface whereby to suppress rocking of the vehicle on intermediate wheels thereof.

5. In a vehicle, the combination of a vehicle body, a pair of tracks movably disposed on opposite sides of the body for propelling the vehicle, at least three wheels disposed in tandem on each side of the body for supporting the body with respect to the tracks, said wheels each having a yielding swinging connection with said vehicle body, and adjusting means for said connections, said yielding swinging connections being adjusted thereby so that the connection for each of a pair of end wheels on each side of the body exerts a greater force on the wheel than the force exerted on the wheels intermediate the end wheels by their yielding means so that each end wheel supports a greater part of the weight of the body than a wheel intermediate the end wheels when the vehicle is on a flat surface whereby to suppress rocking of the vehicle on intermediate wheels thereof with respect to the tracks.

6. In a vehicle, the combination of a vehicle body, a pair of tracks movably disposed on opposite sides of the body for propelling the vehicle, a plurality of wheels disposed in tandem on each side of the body for supporting the body with respect to the tracks, said plurality of wheels on each side of the body comprising a plurality of intermediate wheels and a plurality of end wheels both in front of and behind the intermediate wheels, said wheels each having a yielding swinging connection with said vehicle body, and adjusting means for said connections, each of said connections comprising a reaction arm adjustable with respect to the body of the vehicle by said adjusting means for varying the effectiveness of the yieldable connection, the reaction arms of said connections for each of the end wheels on each side of the body exerts a greater force on the wheel than the force exerted on the wheels intermediate the end wheels by their yielding means so that each end wheel supports a greater part of the weight of the body than each of the intermediate wheels when the vehicle is on a flat surface whereby to suppress rocking of the vehicle on intermediate wheels thereof.

7. In a vehicle, the combination of a vehicle body, a pair of tracks movably disposed on opposite sides of the body for propelling the vehicle, a plurality of wheels on each side of the body for supporting the body with respect to said tracks and each having a yielding swinging connection with said body, each of said connections comprising an inner cylinder pivoted with respect to said body, an outer cylinder, a member of rubber-like material between said cylinders and fixed to each of the cylinders, a pair of arms fixed to said outer cylinder for supporting a wheel, a pair of reaction arms fixed to said inner cylinder, said member of rubber-like material being subject to fatigue, and means fixing said reaction arms with respect to said body, said last named means being adjustable whereby the load on the various wheels and associated rubber-like members may be adjusted as desired and whereby for compensating for fatigue in said members.

8. In a vehicle, the combination of a vehicle body, a supporting wheel for the body, and means providing a yielding swinging connection of said wheel with said vehicle body and including an outer cylinder and an inner cylinder, a member of rubber-like material between said cylinders and fixed to each of the cylinders, a pair of arms for supporting said wheel and fixed to said outer cylinder, a pair of reaction arms fixed to said inner cylinder at opposite ends thereof, said rubber-like member being subject to fatigue, and means for fixing said reaction arms with respect to said body, said last-named means being adjustable for increasing the force applied to said wheel by said rubber-like member for a certain position of the wheel with respect to said body for compensating for fatigue in the rubber-like member.

BENJAMIN A. SWENNES.

REFERENCES CITED

The following references are of record in the file of this patent:

UNITED STATES PATENTS

| Number | Name | Date |
|---|---|---|
| 2,011,565 | Barnes | Aug. 20, 1935 |
| 2,113,545 | Herrington | Apr. 5, 1938 |
| 2,149,297 | Knox | Mar. 7, 1939 |
| 2,162,198 | Herrington | June 13, 1939 |
| 2,191,211 | Krotz | Feb. 20, 1940 |
| 2,201,422 | Beebe | May 21, 1940 |